United States Patent
Itsuji et al.

(10) Patent No.: US 9,499,023 B2
(45) Date of Patent: Nov. 22, 2016

(54) INSULATOR FOR SUSPENSION DEVICE

(71) Applicant: TOYOTA JIDOSHA KABUSHIKI KAISHA, Toyota-shi, Aichi (JP)

(72) Inventors: Takashi Itsuji, Nagakute (JP); Tomohito Enomoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/799,407

(22) Filed: Jul. 14, 2015

(65) Prior Publication Data

US 2016/0052358 A1 Feb. 25, 2016

(30) Foreign Application Priority Data

Aug. 21, 2014 (JP) ................ 2014-168290

(51) Int. Cl.
| | |
|---|---|
| *B60G 11/22* | (2006.01) |
| *B60G 11/52* | (2006.01) |
| *B60G 11/14* | (2006.01) |
| *B60G 11/16* | (2006.01) |
| *B60G 15/06* | (2006.01) |

(52) U.S. Cl.
CPC ............ *B60G 11/52* (2013.01); *B60G 11/14* (2013.01); *B60G 11/16* (2013.01); *B60G 15/063* (2013.01); *B60G 2202/12* (2013.01); *B60G 2204/124* (2013.01); *B60G 2204/1242* (2013.01); *B60G 2204/12422* (2013.01)

(58) Field of Classification Search
CPC ............ F16F 9/32; F16F 9/062; F16F 9/067; F16F 9/16; F16F 9/3214; B60G 11/16; B60G 11/22; B60G 15/06; B60G 15/063; B60G 15/067068; B60G 2204/1241; B60G 2204/128; B60G 2204/129

USPC ........................... 188/321.11; 267/220, 221; 280/124.127, 124.155
See application file for complete search history.

(56) References Cited

U.S. PATENT DOCUMENTS

| | | | | |
|---|---|---|---|---|
| 5,421,565 | A * | 6/1995 | Harkrader | B60G 11/16 267/153 |
| 6,273,407 | B1 * | 8/2001 | Germano | B60G 13/005 267/172 |
| 2006/0131119 | A1 * | 6/2006 | Ishikawa | B60G 15/063 188/321.11 |
| 2014/0265081 | A1 * | 9/2014 | Nakano | B60G 11/16 267/220 |

FOREIGN PATENT DOCUMENTS

| | | |
|---|---|---|
| JP | 2003237406 A | 8/2003 |
| JP | 2007022323 A | 2/2007 |
| JP | 2009056852 A | 3/2009 |
| JP | 2014199134 A | 10/2014 |

* cited by examiner

*Primary Examiner* — Christopher Schwartz
(74) *Attorney, Agent, or Firm* — Oliff PLC (57) ABSTRACT

The invention relates to an insulator for a suspension device having a coil spring and a spring seat for supporting the coil spring. The insulator is provided between the coil spring and the spring seat and comprises at least an annular seat groove in which a coil end of the coil spring is seated. The insulator comprises at least an adjustment recess formed in the insulator along the seat groove so as to open at a wall surface of the insulator where the seat groove opens. The adjustment recess is configured to allow the seat groove to be deformed to increase a radial groove width between inner and outer edge ends of the seat groove when the coil end enters into the seat groove.

3 Claims, 7 Drawing Sheets

INSULATOR FOR SUSPENSION DEVICE

BACKGROUND ART

1. Field of the Invention

The invention relates to an insulator FOR a suspension device, provided between a coil spring of the suspension device and a spring seat of the suspension device.

2. Description of the Related Art

Conventionally, an insulator for a suspension device is provided between a coil spring of a suspension device and a spring seat of the suspension device. The insulator serves to suppress a transmission of vibration of the coil spring to a vehicle body and prevent a contact of the coil spring to the spring seat directly to prevent a generation of abnormal noise.

For example, the JP 2009-56852 A discloses a lower insulator made of rubber material. The lower insulator is provided with a seat part (a seat groove) having an annular shape in plan view and a recessed (generally semicircle) shape in cross-sectional view.

SUMMARY OF THE INVENTION

Figure 7A:
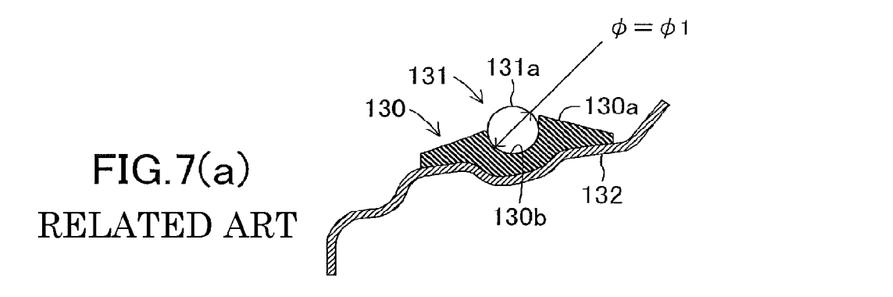
FIG. 7(a) is a cross sectional view of an insulator of a related art in which a coil end of a coil spring having a wire diameter is seated in a seat groove of the insulator.

As shown in FIG. 7(a), the seat part (the seat groove) 130b of the insulator 130 of the related art has a shape adapted for a coil end 131a of the coil spring 131 having a wire diameter Φ to be seated in the seat part (the seat groove) 130b. Therefore, the coil end 131a of the coil spring 131 can enter into the seat groove 130b of the insulator 130. As a result, the insulator 130 of the related art allows the coil end 131a of the coil spring 131 to be appropriately seated in the seat groove 130b.

In this case, the coil end 131a of the coil spring 131 has entered deeply into the seat groove 130b until the outer peripheral surface of the coil end 131a tightly contacts the surface (the inner peripheral surface) defining the seat groove 130b. Therefore, when the coil spring 131 elongates and contracts, the coil end 131a is unlikely to drop out of the seat groove 130b and thus, the inner peripheral wall surface defining the seat groove 130b may not expose to the outside. As a result, the contaminants such as a sand and a mud is prevented from entering into the seat groove 130b.

Figure 7B:
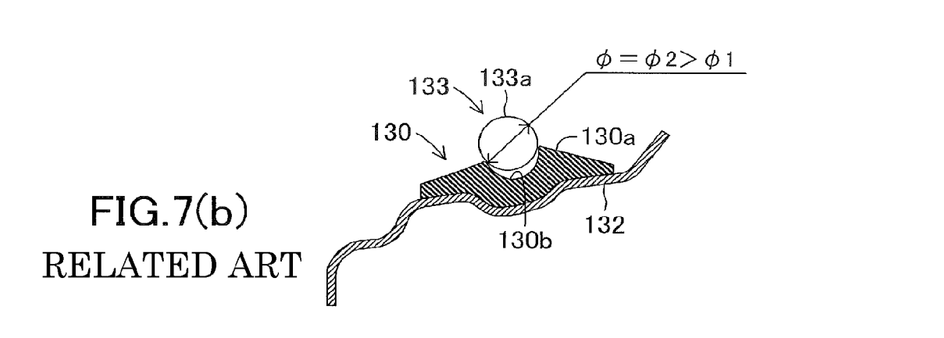
FIG. 7(b) is a cross sectional view of the insulator of the related art in which a coil end of a coil spring having a wire diameter different from the wire diameter of the coil spring shown in FIG. 7(a) is seated in the seat groove of the insulator.

A wire diameter of the coil spring may vary, depending on a type of the vehicle or depending on a grade, a destination and the like of the vehicle even when the type of the vehicle is the same. In this case, as shown in FIG. 7(b), in case that a coil spring 133 having a wire diameter Φ2 larger than the wire diameter Φ1 of the coil spring 131 is used, the coil end 133a of the coil spring 133 has to spread the seat groove 130b when the coil end 133e enters into the seat groove 130b.

On the other hand, the insulator 130 is secured to the spring seat 132. Thus, the insulator 130 is unlikely to be deformed radially. As a result, as shown in FIG. 7(b), in case that the coil spring 133 having the wire diameter Φ2 is used for the insulator 130 having the seat groove 130b having a shape matching the wire diameter Φ1, the coil end 133a of the coil spring 133 cannot be appropriately seated in the seat groove 130b. In other words, the coil end 133a cannot enter into the seat groove 130b deeply and thus, the outer peripheral wall surface of the coil end 133a cannot contact the inner peripheral wall surface of the seat groove 130b tightly.

Thus, when the coil spring 133 elongates and contracts, the coil end 133a is likely to drop out of the seat groove 130b and thus, the inner peripheral wall surface defining the seat groove 130b may expose to the outside. If the inner peripheral wall surface defining the seat groove 130b exposes to the outside, the contaminants may enter into the seat groove 130b and the outer peripheral wall surface of the coil end 133a may rub against the contaminants when the coil spring 131 elongates and contracts. As a result, for example, a corrosive-resistant paint applied to the outer peripheral wall face of the coil end 133b may be removed and thus, the coil spring may be corroded.

The invention is to solve the problem described above and the object of the invention is to provide an insulator for a suspension device in which the coil spring can be appropriately seated even when the wire diameter of the coil spring varies.

In order to accomplish the object described above, the insulator (17, 18) for the suspension device (10) according to the invention is formed of a resilient body and is provided between the coil spring (14) of the suspension device (10) and the spring seat (15, 16) for supporting the coil spring. The insulator for the suspension device according to the invention comprises at least an annular seat groove (17b, 18b) in which the coil end (14a, 14b) of the coil spring is seated.

The insulator for the suspension device according to the invention comprises at least an adjustment recess (17c, 18c) formed in the insulator along the seat groove so as to open at a wall surface of the insulator where the seat groove opens. The adjustment recess is configured to allow the seat groove to be deformed to increase a radial groove width between inner and outer edge ends of the seat groove when the coil end of the coil spring enters into the seat groove.

The adjustment recess is configured to allow the seat groove to be deformed to increase a radial groove width between inner and outer edge ends of the seat groove when the coil end of the coil spring enters into the seat groove. Therefore, even when the insulator is secured to the spring seat, the seat groove can be spreaded.

As a result, in case that the coil end of the coil spring has a large wire diameter and in case that the wire diameter of the coil end varies, the coil end of the coil spring can easily spread the seat groove when the coil end enters into the seat groove. Further, in case that the spring radius of the coil end is different from a set value, the coil end can easily spread seat groove, depending on the magnitude of the spring radius.

Therefore, in case that the coil end of the coil spring has a large wire diameter, in case that the wire diameter of the coil end varies and in case that the spring radius of the coil end varies, the coil end can enter easily deeply into the seat groove. Thereby, the seat groove can house the coil end and allow the coil end to be appropriately seated therein. As a result, the outer peripheral wall surface of the coil end can contact the inner peripheral wall surface defining the seat groove tightly and thus, the contaminants is prevented from accumulating on the inner peripheral wall surface defining the seat groove. Therefore, the outer peripheral wall surface of the coil end of the coil spring can be prevented from rubbing against the contaminants. Thus, a corrosive-resistant paint applied to the outer peripheral wall surface of the coil end can be prevented from being removed and thus, the coil spring can be prevented from being corroded.

In addition, a various kinds of the coil end of the coil spring can be appropriately seated by one kind of the insulator. Therefore, it is not necessary to provide a various kinds of the insulator, depending on the wire diameter of the coil spring. Thus, it is not to manage the manufacturing and inventory of a various kinds of the insulator.

The adjustment recess may be formed in at least one of inner and outer periphery sides of the seat groove. In this case, the adjustment recess may be configured to be deformed so as to decrease a radial distance between inner and outer edge ends of the adjustment recess by an increasing of a groove width of the seat groove when the coil end of the coil spring having a wire diameter larger than the groove width of the seat groove enters into the seat groove.

Also, the adjustment recess may be formed in an inner peripheral wall surface defining the seat groove. In this case, the adjustment recess may be configured to be deformed so as to decrease a radial distance between inner and outer edge ends of the adjustment recess by an increasing of a groove width of the seat groove when the coil end of the coil spring having a wire diameter larger than the groove width of the seat groove enters into the seat groove.

According to these cases, when the seat groove is spreaded, the adjustment recess is deformed to decrease or increase the radial distance between the inner and outer edge ends of the adjustment recess and thus, the seat groove can be easily certainly spread. Thereby, the seat groove can house the coil end and allow the coil end to be appropriately seated therein. As a result, the outer peripheral wall surface of the coil end can certainly tightly contact the inner peripheral wall surface defining the seat groove and thus, the contaminants can be prevented from accumulating on the inner peripheral wall surface defining the seat groove. Therefore, the outer peripheral wall surface of the coil end of the coil spring can be certainly prevented from rubbing against the contaminants. Thus, the corrosive-resistant paint applied to the outer peripheral wall surface of the coil end can be prevented from being removed and thus, the coil end can be prevented from being corroded.

The insulator is often manufactured using a resilient material which is an incompressible material. In this case, a volume of the insulator after the insulator is deformed, is not changed from the volume of the insulator before the insulator is deformed and the Poisson ratio becomes about 0.5. Thus, when the coil end of the coil spring is seated in the seat groove, if the volume of the insulator changes due to the deformation of the seat groove, the outer contour of the insulator may be changed. On the other hand, when the coil end of the coil spring is seated in the seat groove, if the adjustment recess is deformed to decrease (or increase) the distance of the adjustment recess, the change of the volume of the insulator can be absorbed by the spreading of the seat groove. Thereby, when the coil end enters into the seat groove, the seat groove can be easily spreaded and when the coil end of the coil spring is seated in the seat groove, the generation of the unnecessary deformation of the insulator can be prevented.

Note that in the above description, for facilitating an understanding of the invention, the components of the invention are accompanied with symbols used for components of embodiments. However, the components of the invention are not limited to the components of the embodiments defined by the symbol, respectively.

DESCRIPTION OF THE EMBODIMENTS

Figure 1:
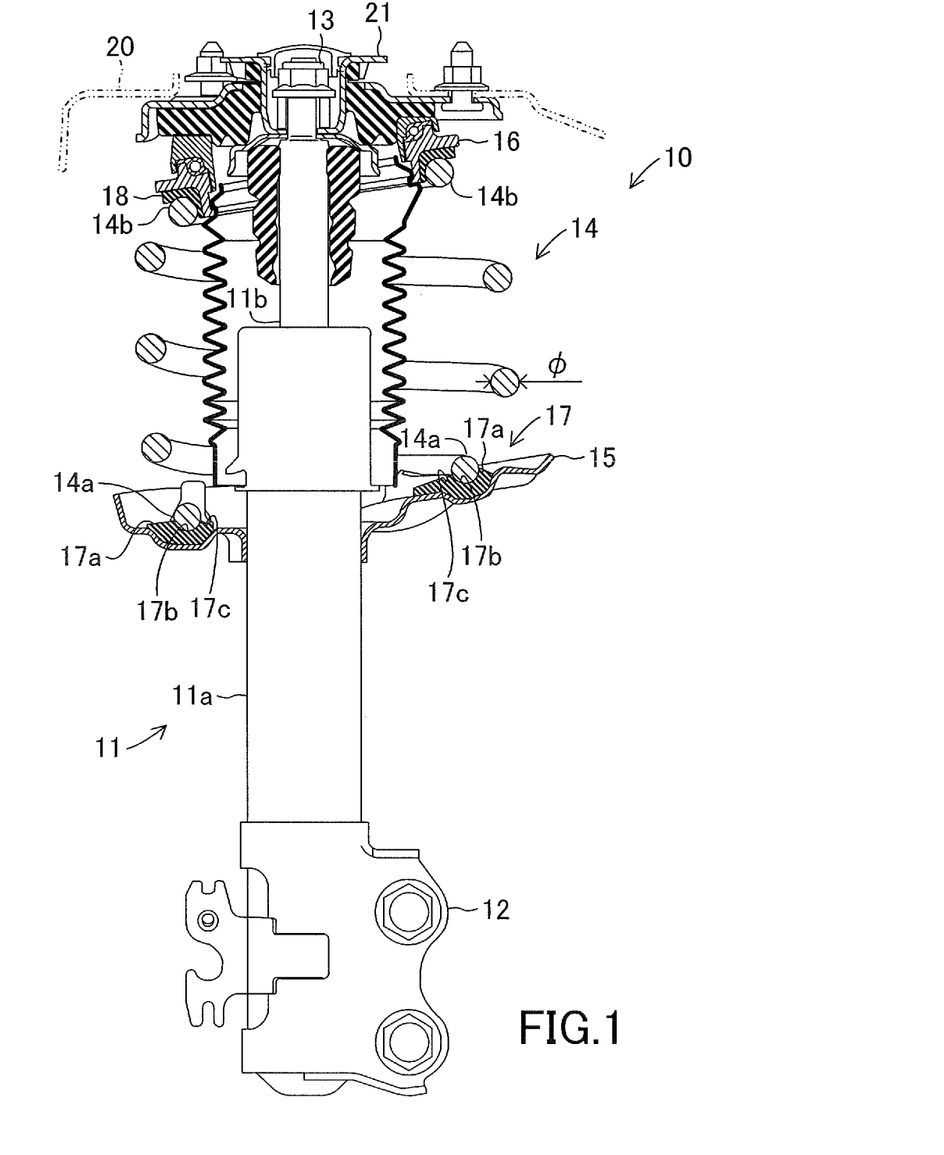
FIG. 1 is a schematic configuration view of a suspension device, to which lower and upper insulators for a suspension according to the invention are assembled.

Below, an insulator according to an embodiment of the invention will be described with reference to the drawings. As shown in FIG. 1, a suspension device 10 is a strut type suspension device. The suspension device 10 comprises a shock absorber 11 and a coil spring 14. The shock absorber 11 is disposed, oriented in a vehicle vertical direction. The shock absorber 11 has a cylinder 11a and a piston rod 11b. A lower end of the cylinder 11a of the shock absorber 11 is secured to a member relating to a wheel (such as a suspension arm not shown) via a bracket 12. An upper end of the piston rod 11b of the shock absorber 11 is fastened to an upper support 21 by a nut 13. The upper support 21 is fixed to a vehicle body 20.

The coil spring 14 is formed by winding a wire having a wire diameter $\Phi$ in a coil shape. The wire diameter $\Phi$ of the wire forming the coil spring 14 varies, depending on a type of a vehicle or depending on a grade and a destination of the vehicle even when the type of the vehicle is the same. The coil spring 14 is positioned around an outer periphery of the shock absorber 11. Thus, the suspension device 10 has an lower spring seat 15, an upper spring seat 16, a lower insulator 17 and an upper insulator 18. The lower spring seat 15 is secured to an outer peripheral wall surface of the cylinder 11a of the shock absorber 11 by welding. The upper spring seat 16 is assembled just below the upper support 21 via a bearing. The lower insulator 17 is secured to an upper wall surface of the lower spring seat 15. The upper insulator 18 is secured to a lower wall surface of the upper spring seat 16.

A lower side coil end 14a of the coil spring 14 seats on the lower insulator 17. Thus, the coil spring 14 is supported by the lower spring seat 15 via the lower insulator 17. Further, an upper side coil end 14b of the coil spring 14 seats on the upper insulator 18. Thus, the coil spring 14 is supported by the upper spring seat 16 via the upper insulator 18.

The lower and upper insulators 17 and 18 are formed of resilient material having a predetermined hardness, respectively. Thereby, the lower and upper insulators 17 and 18 suppress the transmission of the vibration to the vehicle body 20 via the coil spring 14.

Further, the lower insulator 17 prevents the contact of the lower side coil end 14a of the coil spring 14 with the lower spring seat 15 and as a result, the lower insulator 17 prevents the generation of the abnormal noise due to the contact of the lower side coil end 14a with the lower spring seat 15. The upper insulator 18 prevents the contact of the upper side coil end 14b of the coil spring 14 with the upper spring seat 16 and as a result, the upper insulator 18 prevents the generation of the abnormal noise due to the contact of the upper side coil end 14b with the upper spring seat 16.

Figure 2:
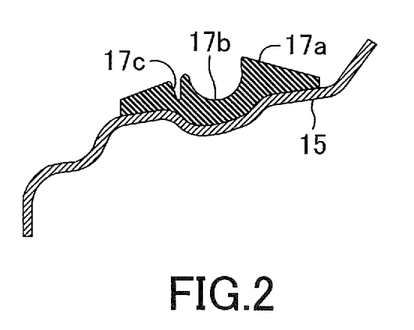
FIG. 2 is a cross sectional view of a configuration of the lower insulator shown in FIG. 1.

The lower insulator 17 includes an annular body part 17a formed along the outer periphery of the cylinder 11a of the shock absorber 11. As shown in FIG. 2, a seat groove 17b is formed in the body part 17a. The lower side coil end 14a of the coil spring 14 is housed in the seat groove 17b and is seated in the seat groove 17b. Further, an adjustment recess 17c is formed in the body part 17a. The seat groove 17b can be deformed by the adjustment recess 17c such that the seat groove 17b is spreaded when the wire diameter $\Phi$ of the lower side coil end 14a of the coil spring 14 has been changed.

The seat groove 17b is formed having an annular shape (a circular shape), depending on the spring radius of the lower side coil end 14a of the coil spring 14. The radial cross-sectional shape of the annular seat groove 17b is semicircular, depending on the circular cross-sectional shape of the lower side coil end 14a. The diameter (corresponding to the groove width) of the inner periphery wall surface of the semicircular seat part 17b formed in the body part 17a is determined such that the lower side coil end 14a having the wire diameter $\Phi 1$ is housed and seated in the seat part 17b. The wire diameter $\Phi 1$ is the smallest one among the wire diameters $\Phi$ of the lower side coil part 14a each varied, depending on the type or grade of the vehicle or the like. Note that the groove width of the annular seat part 17b corresponds to a radial distance between the inner and outer edge ends of the seat part 17b.

The adjustment recess 17c is formed in the body part 17a to allow the lower coil end 14a to spread the seat groove 17b when the lower side coil end 14a enters into the seat groove 17b in case that the wire diameter $\Phi$ of the lower side coil end 14a of the coil spring 14 has been changed to a wire diameter $\Phi 2$ larger than the wire diameter $\Phi 1$. Thus, the adjustment recess 17c is formed annually (circularly) extending in the body part 17a along the seat groove 17b at the inner periphery side of the seat groove 17b (at the side of the shock absorber 11). The radial cross-sectional shape of the annular adjustment recess 17c is a V-shape.

Again, referring to FIG. 1, the upper insulator 18 is annually formed along the outer periphery of the piston rod 11b of the shock absorber 11. The radial cross-sectional shape of the annular upper insulator 18 is a L-shape. Thereby, the upper insulator 18 is positioned between an upper spring seat portion of the upper spring seat 16 and a coil spring portion of the coil spring 14. The upper spring seat portion includes a cylindrical portion of the upper spring seat 16 and a flange portion extending radially from the cylindrical portion. The coil spring portion includes an inner peripheral portion and the upper end portion of the upper side coil end 14b of the coil spring 14.

The suspension device 10 is provided with a bound stopper and a dust cover. Note that the detailed descriptions of the bound stopper and the dust cover will be omitted since the bound stopper and the dust cover are not essential components of the invention. The bound stopper is provided on the lower portion of the upper support 21. The bound stopper serves to restrict the excessive movement of the cylinder 11a when the shock absorber 11 contracts. The dust cover is provided at an inner side of the coil spring 14. The dust cover serves to prevent contaminants from adhering to the outer peripheral surface (a sliding surface) of the piston rod 11b of the shock absorber 11.

When the suspension device 10 is assembled to the vehicle body 20, the coil spring 14 is supported between the lower and upper spring seats 15 and 18 (the lower and upper insulators 17 and 18) under the state that the coil spring 14 is pre-compressed. Therefore, the lower side coil end 14a of the coil spring 14 is biased toward the lower insulator 17 and the upper side seat part 14b of the coil spring 14 is biased toward the upper insulator 18.

Figure 3A:
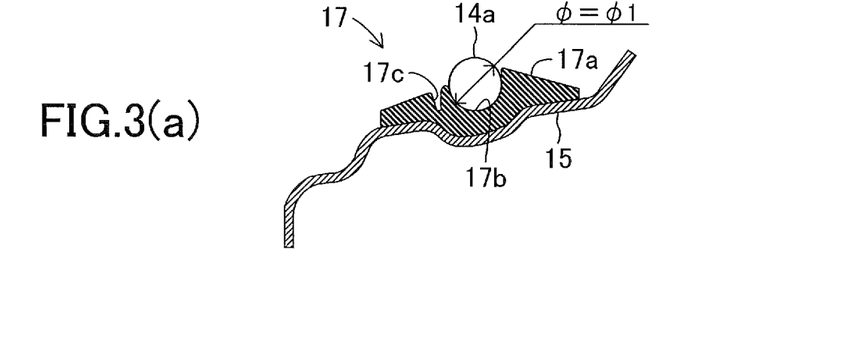
FIG. 3(a) is a cross sectional view of the lower insulator in which a coil end of a coil spring having a wire diameter of $\Phi 1$ is seated in a seat groove of the lower insulator.

In this case, the semicircular seat groove 17b of the lower insulator 17 is formed matching the wire diameter $\Phi 1$ corresponding to a set lower limit value of the wire diameter of the lower side coil end 14a of the coil spring 14. That is, the groove width of the seat groove 17b corresponds to the wire diameter $\Phi$ of the lower side coil end 14a. Thus, in case that the wire diameter $\Phi 1$, of the lower side coil end 14a of the coil spring 14 is a wire diameter $\Phi 1$, as show in FIG. 3(a), the lower seat part 14a enters deeply into the seat groove 17b and is seated in the seat groove 17b without spreading the seat groove 17b when the lower side coil end 14a is biased toward the seat groove 17b. Thus, in case that the wire diameter $\Phi$ of the lower side coil end 14a is the wire diameter $\Phi 1$, the adjustment recess 17c is not deformed, that is, the groove width of the adjustment recess 17c corresponding to a radial distance between the inner and outer edge ends of the adjustment recess 17c is not decreased.

As described above, the wire diameter $\Phi$ of the coil spring 14 may be changed, depending on the type of the vehicle or depending on the grade of the vehicle even when the type of the vehicle is the same. Normally, for the sports type or grade of the vehicle, in order to increase a spring constant of the coil spring 14, the wire diameter $\Phi$ is set to a wire diameter $\Phi 2$ larger than the wire diameter $\Phi 1$.

Figure 3B:
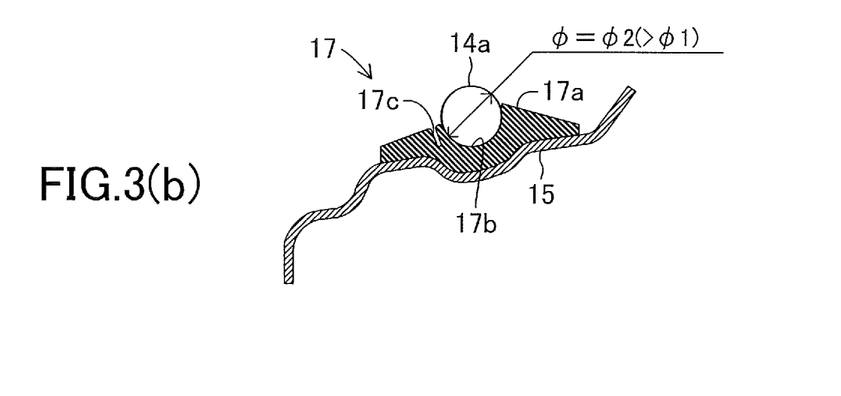
FIG. 3(b) is a cross sectional view of the lower insulator in which a coil end of a coil spring having a wire diameter of $\Phi 2$ is seated in the seat groove of the lower insulator.

In case that the wire diameter $\Phi$ of the lower side coil end 14a of the coil spring 14 is the wire diameter $\Phi 2$ larger than the wire diameter $\Phi 1$, the groove width of the seat groove 17b is smaller (narrower) than the wire diameter $\Phi 2$ of the lower side coil end 14a since the seat groove 17b is formed such that the groove width of the seat groove 17b matches the wire diameter $\Phi 1$ of the lower side coil end 14a. Thus, as shown in FIG. 3(b), in case that the lower side coil end 14a is biased toward the seat groove 17b, the lower side coil end 14a enters into the seat groove 17b while the lower side coil end 14a spreads the seat groove 17b.

The adjustment recess 17c is formed in the body part 17a of the lower insulator 17 along the seat groove 17b. Thus, when the adjustment recess 17c is deformed such that the groove width of the adjustment recess 17c is decreased, a portion between the seat groove 17b and the adjustment recess 17c of the body part 17a is deformed to move toward the adjustment recess 17c. As a result, even in case that the lower insulator 17 is secured to the lower spring seat 15, small is a resistance of the entry of the lower side coil end 14a of the coil spring 14 into the seat groove 17b while the lower side coil end 14a spreads the seat groove 17b until the lower side coil end 14a is seated in the seat groove 17b. Therefore, the lower side coil end 14a having the wire diameter $\Phi 2$ can spread the seat groove 17b with a biasing force derived from the pre-compression described above and as a result, the lower side coil end 14*a* can enter deeply into the seat groove 17*b* and be seated in the seat groove 17*b*.

As understood from the above description, according to the embodiment described above, the lower insulator 17 allows the lower side coil end 14*a* of the coil spring 14 having any wire diameter Φ such as the wire diameter Φ1 and the wire diameter Φ2 larger than the wire diameter Φ1 to be appropriately seated in the seat groove 17*b*. Thus, the lower side coil end 14*a* of the coil spring 14 does not drop out of the seat groove 17*b* and thus, the wall surface (the inner peripheral wall surface) defining the seat groove 17*b* does not expose to the outside.

As a result, the contaminants is unlikely to enter into the seat groove 17*b* and thus, the contaminants may not accumulate between the outer peripheral wall surface of the lower side coil end 14*a* of the coil spring 14 and the wall surface (the inner peripheral wall surface) defining the seat groove 17*b*. Thereby, even if the lower side coil end 14*a* of the coil spring 14 moves vertically and rotates due to the function of the suspension device 10, the outer peripheral wall surface of the lower side coil end 14*a* may not rub against the contaminants. As a result, a corrosive-resistant paint applied to the lower side coil end 14*a* of the coil sprig 14 can be prevented from being removed and thus, the coil spring 14 can be prevented from being corroded.

<Modification>

Figure 4:
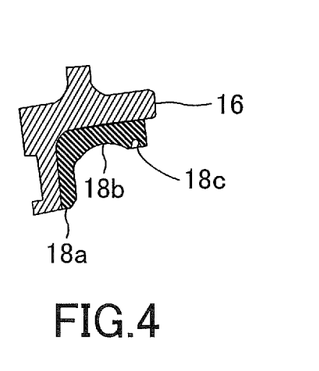
FIG. 4 is a cross sectional view of a modification of the upper insulator shown in FIG. 1.

In the above description of the embodiment, the lower insulator 17 has been described. The upper insulator 18 has a similar configuration to the configuration of the lower insulator 17. In this modification, as shown in FIG. 4, the upper insulator 18 has an annular body part 18*a* and a seat groove 18*b* and an adjustment recess 18*c* are formed in the body part 18*a*.

The seat groove 18*b* is formed having an annular shape (a circular shape), depending on the spring radius of the upper side coil end 14*b* of the coil spring 14. The radial cross-sectional shape of the annular seat groove 18*b* is an arc shape depending on the circular shape of the cross-section of the upper side coil end 14*b*. The diameter of the inner peripheral wall surface defining the arc seat groove 18*b* is determined such that the upper side coil end 14*b* having the wire diameter Φ1 can be housed and seated in the seat groove 18*b*. The wire diameter Φ1 is a set lower limit value of the wire diameter among the wire diameters Φ of the upper side coil end 14*b*, each varied depending on the type or grade or the like of the vehicle. Note that the groove width of the annular seat groove 18*b* corresponds to a radial distance between the inner and outer edge ends of the seat groove 18*b*.

In case that the wire diameter Φ3 of the upper side coil end 14*b* of the coil spring 14 is changed from the wire diameter Φ1 to the wire diameter Φ2 larger than the wire diameter Φ1, the adjustment recess 18*c* serves to allow the upper side coil end 14*b* to spread the seat groove 18*b* when the upper side coil end 14*b* is seated in the seat groove 18*b*. The adjustment recess 18*c* is formed having an annular shape (a circular shape) along the seat groove 18*b* at the outer peripheral side of the seat groove 18*b* of the body part 18*a*. The radial cross-sectional shape of the annular adjustment recess 18*c* is a V-shape.

Figure 5A:
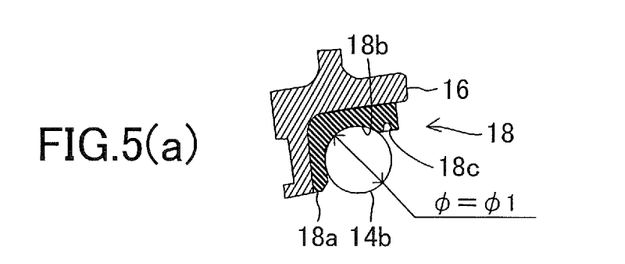
FIG. 5(a) is a cross sectional view of the upper insulator in which the coil end of the coil spring having the wire diameter of $\Phi 1$ is seated in a seat groove of an upper insulator.

As described above, the upper side coil end 14*b* of the coil spring 14 is biased toward the upper insulator 18 since the coil spring 14 is supported under the state that the coil spring 14 is pre-compressed. In this case, the seat groove 18*b* is formed matching the wire diameter Φ1 which is the set lower limit value of the wire diameter of the upper side coil end 14*b* of the coil spring 14. Thus, in case that the wire diameter Φ of the upper side coil end 14*b* of the coil spring 14 is the wire diameter Φ1, as shown in FIG. 5(*a*), the upper side coil end 14*b* is seated in the seat groove 18*b* without spreading the seat groove 18*b* when the upper side coil end 14*b* is biased toward the seat groove 18*b*. Thereby, in case that the wire diameter Φ of the upper side coil end 18*b* is the wire diameter Φ1, the adjustment recess 18*c* is not deformed, that is, a groove width of the adjustment recess 18*c* corresponding to a radial distance between the inner and outer edge ends of the adjustment recess 18*c*, is not narrowed.

Figure 5B:
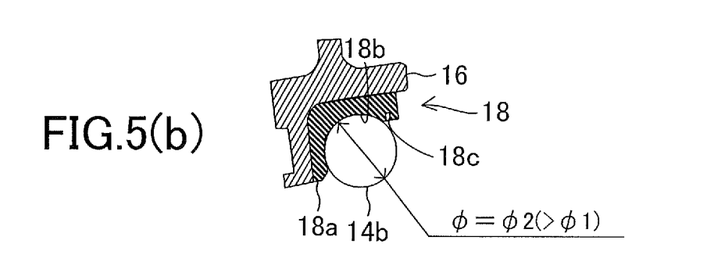
FIG. 5(b) is a cross sectional view of the upper insulator in which the coil end of the coil spring having the wire diameter of $\Phi 2$ is seated in the seat groove of the upper insulator.

In case that the wire diameter Φ of the upper side coil end 14*b* of the coil spring 14 is the wire diameter Φ2 larger than the wire diameter Φ1, the groove width of the seat groove 18*b* is smaller (narrower) than the wire diameter Φ2 of the upper side coil end 14*b* since the seat groove 18*b* is formed such that the groove width of the seat groove 18*b* matches the wire diameter Φ1 of the upper side coil end 14*b*. Thus, as shown in FIG. 5(*b*), the upper side coil end 14*b* is seated in the seat groove 18*b* while spreading the seat groove 18*b* when the upper side coil end 14*b* is biased toward the seat groove 18*b*.

The adjustment recess 18*c* is formed in the body part 18*a* of the upper insulator 18 along the seat groove 18*b*. Thus, when the adjustment recess 18*c* is deformed such that the groove width of the adjustment recess 18*c* is decreased, a portion between the seat groove 18*b* and the adjustment recess 18*c* of the body part 18*a* can be deformed such that the portion moves toward the adjustment recess 18*c*. As a result, even when the upper insulator 18 is secured to the upper spring seat 16, small is a resistance of the entry of the upper side coil end 14*b* of the coil spring 14 into the seat groove 18*b* while the upper side coil end 14*b* spreads the seat groove 18*b* until the upper side coil end 14*b* is seated in the seat groove 18*b*. Therefore, the upper side coil end 14*b* having the wire diameter Φ2 can spread the seat groove 18*b* with the biasing force derived from the pre-compression described above and as a result, the upper side coil end 14*b* can be seated in the seat groove 18*b*.

The upper insulator 18 allows the upper side end coil 14*b* of the coil spring 14 having any wire diameter Φ such as the wire diameters Φ1 and Φ2 to be seated in the seat groove 18*b*. Thereby, the contaminants are unlikely to adhere to the wall surface defining the seat groove 18*b* and thus, the contaminants may not accumulate between the outer peripheral wall surface of the upper side end coil 14*b* of the coil spring 14 and the wall surface (the inner peripheral wall surface) defining the seat groove 18*b*. Thereby, even if the upper side coil end 14*b* of the coil spring 14 moves vertically and rotates due to the function of the suspension device 10, the outer peripheral wall surface of the upper side coil end 14*b* may not rub against the contaminants. As a result, the corrosive-resistant paint applied to the upper side coil end 14*b* of the coil spring 14 is prevented from being removed and thus, the coil spring 14 is prevented from being corroded.

The invention is not limited to the embodiment and modification described above and various modifications can be employed within the scope of the invention.

For example, in the embodiment described above, in case that the wire diameter Φ of the lower side coil end 14*a* of the coil spring 14 is changed, for example, from the wire diameter Φ1 to the wire diameter Φ2, the lower side coil end 14*a* can be appropriately seated in the seat groove 17*b* of the lower insulator 17 since the lower side coil end 14*a* spreads the seat groove 17*b*. In the modification described above, in case that the wire diameter Φ of the upper side coil end 14*b* of the coil spring 14 is changed, for example, from the wire diameter Φ1 to the wire diameter Φ2, the upper side coil end 14b can be appropriately seated in the seat groove 18b of the upper insulator 18 since the upper side coil end 14b spreads the seat groove 18b.

The coil spring 14 is manufactured by winding a steel wire into a coil shape. Thus, the wire diameter Φ of the wire may vary within a design tolerance. Even when the wire diameter Φ differs from the set value (Φ1 or Φ2), the adjustment recesses 17c and 18c allow the seat grooves 17c and 18c to be easily spreaded, respectively. Therefore, the lower side coil ends 14a and 14b of the coil spring 14 can be appropriately seated in the seat grooves 17b and 18b, respectively.

Further, the spring radii of the lower and upper side coil ends 14a and 14b may vary within the design tolerance, respectively. However, even when the spring radius is larger or smaller than the set value, the adjustment recesses 17c and 18c allow the seat grooves 17c and 18c to be easily spreaded, respectively. Therefore, the lower and upper side coil ends 14a and 14b of the coil spring 14 can be appropriately seated in the seat grooves 17b and 18b, respectively.

In the embodiment described above, the adjustment recess 17c of the lower insulator 17 is provided at the inner periphery side of the seat groove 17b. However, the adjustment recess 17c of the lower insulator 17 may be provided at an outer periphery side of the seat groove 17b. Further, the adjustment recesses 17c of the lower insulator 17 may be provided at the inner and outer periphery sides of the seat groove 17b, respectively.

In the modification described above, the adjustment recess 18c of the upper insulator 18 is provided at the outer periphery side of the seat groove 18b. However, the adjustment recess 18c of the upper insulator 18 may be provided at an inner periphery side of the seat groove 18b. Further, the adjustment recesses 18c may be provided at the inner and outer periphery sides of the seat groove 18b, respectively.

Note that the lower side coil end 14a is manufactured having an outer radius corresponding to a set spring radius and the upper side coil end 14b is manufactured having an inner radius corresponding to a set spring radius. Therefore, in case that the wire diameter Φ of the coil spring 14 is determined as the larger wire diameter Φ2 and in case that the wire diameter Φ of the coil spring 14 has varied as described above, the increasing of the wire diameter Φ and the variability of the wire diameter Φ are likely to influence the lower side coil end 14a radially and inwardly. Thus, it is preferred that the adjustment recess 17c is formed in the lower insulator 17 at the inner periphery side of the seat groove 17b. On the other hand, in case that the wire diameter Φ of the coil spring 14 is determined as the larger wire diameter Φ2 and in case that the wire diameter Φ of the coil spring 14 has varied as described above, the increasing of the wire diameter Φ and the variability of the wire diameter Φ are likely to influence the upper side coil end 14b radially and outwardly. Thus, it is preferred that the adjustment recess 18c is formed in the upper insulator 18 at the outer periphery side of the seat groove 18b.

In the embodiment and modification described above, the adjustment recesses 17c and 18c are formed along the seat grooves 17b and 18b over the entire periphery of the seat grooves 17b and 18b, respectively. On the other hand, the adjustment recesses 17c and 18c may be formed along a partial area (partial areas) of the seat grooves 17b and 18b, respectively.

Further, in the embodiment described above, the adjustment recess 17c is formed along the seat groove 17b at the inner periphery side of the seat groove 17b. In the modification described above, the adjustment recess 18c is formed along the seat groove 18b at the outer periphery side of the seat groove 18b. In these cases, when the lower side coil end 14a having the wire diameter Φ2 enters into the seat groove 17b, the groove width of the adjustment recess 17c is decreased and when the upper side coil end 14b having the wire diameter Φ2 enters into the seat groove 18b, the groove width of the adjustment recess 18c is decreased.

Figure 6A:
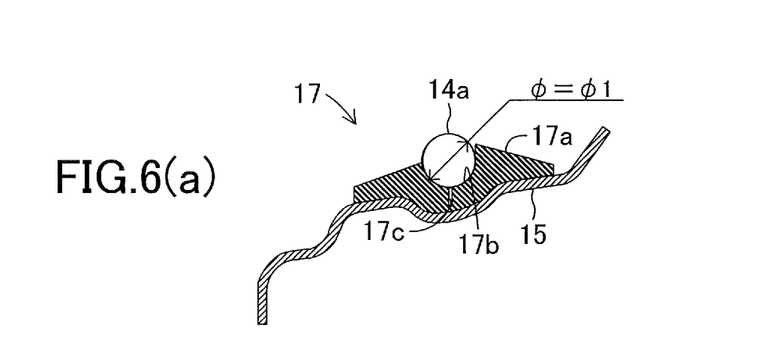
FIGS. 6(a) and 6(b) are cross sectional views of a modification of the lower insulator shown in FIG. 1, respectively.
Figure 6B:
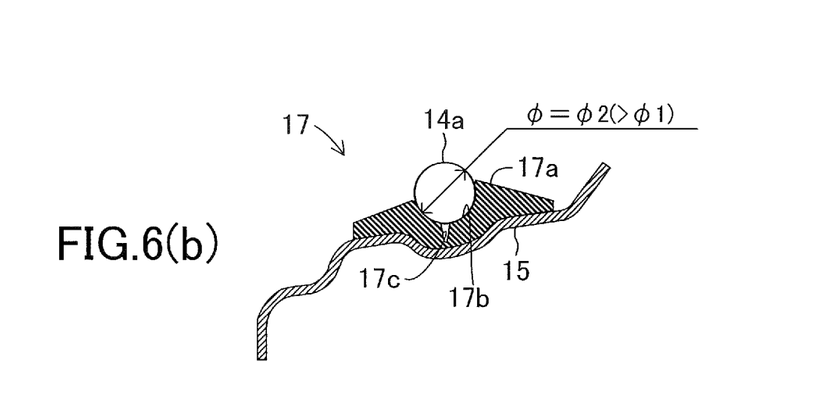

In these cases, as described using the lower insulator 17 shown in FIG. 6, the adjustment recess 17c may be formed on the wall surface defining the seat groove 17b along the seat groove 17b. Further, the adjustment recess 18c may be formed on the wall surface defining the seat groove 18b along the seat groove 18b. In these cases, when the lower side coil end 14a having the wire diameter Φ2 enters into the seat groove 17b, the groove width (the distance) of the adjustment recess 17c is increased and when the upper side coil end 14b having the wire diameter Φ2 enters into the seat groove 18b, the groove width (the distance) of the adjustment recess 18c is increased. When the adjustment recesses 17c and 18c are deformed such that the groove widths of the adjustment recesses 17c and 18c are increased, the groove widths of the seat grooves 17c and 18c can be increased. Therefore, the lower and upper side coil ends 14a and 14b of the spring coil 14 can be appropriately seated in the seat grooves 17b and 18b, respectively.

What is claimed is:

1. An insulator for a suspension device having:
   a coil spring; and
   a spring seat for supporting the coil spring,
   the insulator being formed of a resilient body, provided between the coil spring and the spring seat and comprising at least an annular seat groove in which a coil end of the coil spring is seated,
   wherein the insulator comprises at least an adjustment recess formed in the insulator along the seat groove so as to open at a wall surface of the insulator where the seat groove opens, and
   the adjustment recess is configured to allow the seat groove to be deformed to increase a radial groove width between inner and outer edge ends of the seat groove when the coil end of the coil spring enters into the seat groove.

2. The insulator for the suspension device as set forth in claim 1, wherein the adjustment recess is formed in at least one of inner and outer periphery sides of the seat groove, and
   the adjustment recess is configured to be deformed to decrease a radial distance between inner and outer edge ends of the adjustment recess by an increasing of the groove width of the seat groove when the coil end of the coil spring having a wire diameter larger than the groove width of the seat groove enters into the seat groove.

3. The insulator for the suspension device as set forth in claim 1, wherein the adjustment recess is formed in an inner peripheral wall surface defining the seat groove, and
   the adjustment recess is configured to be deformed to decrease a radial distance between inner and outer edge ends of the adjustment recess by an increasing of the groove width of the seat groove when the coil end of the coil spring having a wire diameter larger than the groove width of the seat groove enters into the seat groove.

* * * * *